W. S. SHAW.
MEASURING AND DISPENSING DEVICE.
APPLICATION FILED DEC. 29, 1919.

1,360,455.  Patented Nov. 30, 1920.

INVENTOR.
Wilber S. Shaw
BY John M. Spellman
ATTORNEY.

UNITED STATES PATENT OFFICE.

WILBER S. SHAW, OF DALLAS, TEXAS.

MEASURING AND DISPENSING DEVICE.

1,360,455.  Specification of Letters Patent.  Patented Nov. 30, 1920.

Application filed December 29, 1919. Serial No. 348,117.

*To all whom it may concern:*

Be it known that I, WILBER S. SHAW, a citizen of the United States, residing at Dallas, in the county of Dallas and State of Texas, have invented certain new and useful Improvements in Measuring and Dispensing Devices, of which the following is a specification.

My invention relates to improvements in measuring and dispensing devices and has particular reference to a device of this character for measuring and dispensing powdered malted milk and other powdered substances.

Another object is to provide a device of this description which will not be complicated and which is strong, durable and cheaply manufactured.

The invention will be more fully understood from the following description, taken in connection with the accompanying drawings, forming part hereof in which—

Figure 1:
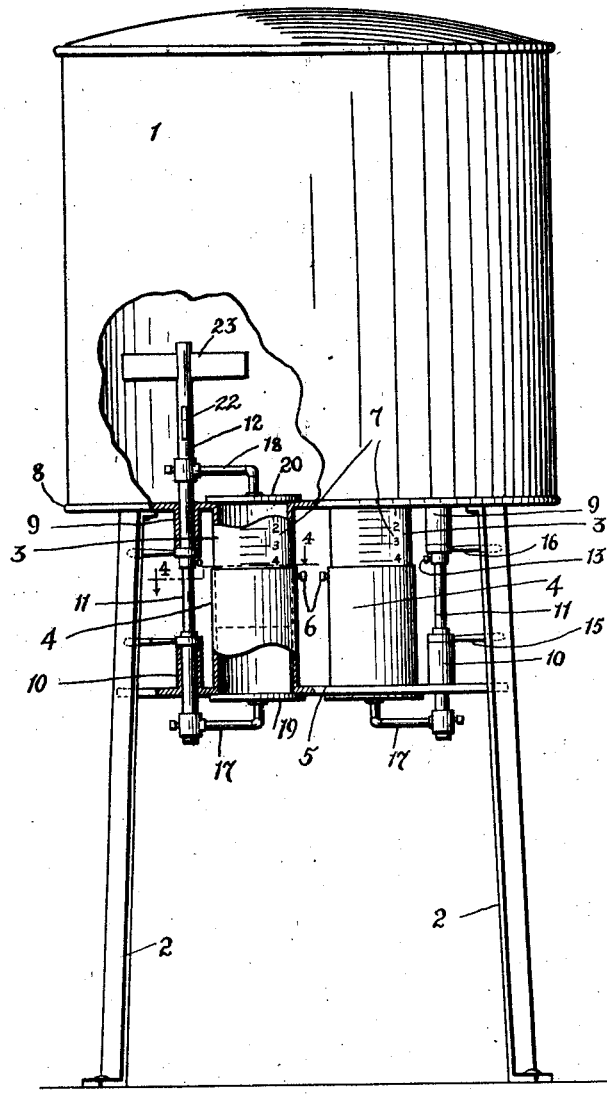
Figure 1 is a side elevational view of the invention, part of the container, also the measuring cylinders, broken away and shown in section.
Figure 2:
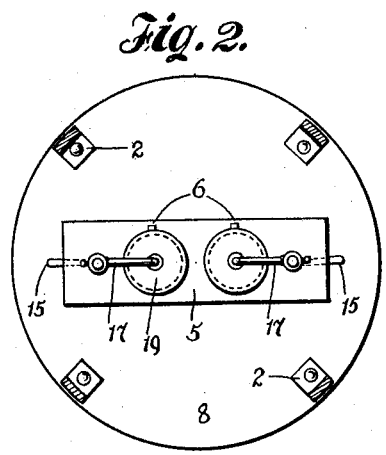
Fig. 2 is a bottom view.

Referring more particularly to the drawings, 1 represents a receptacle preferably of porcelain, although any material suitable for the purpose may be used. The receptacle 1 is supported upon the legs 2—2 which may be bolted to the floor if desired.

Underneath the receptacle 1 are the measuring means consisting of the cylinders 3 and 4 which are telescopically arranged one within the other, the lower cylinder 4 formed integral with the platform 5. Each lower cylinder 4 has a set screw 6 to secure it onto the upper cylinder 3 when the two cylinders are properly adjusted for the desired measurement as indicated at 7 on the upper cylinder 3, preferably in ounces.

Figure 3:
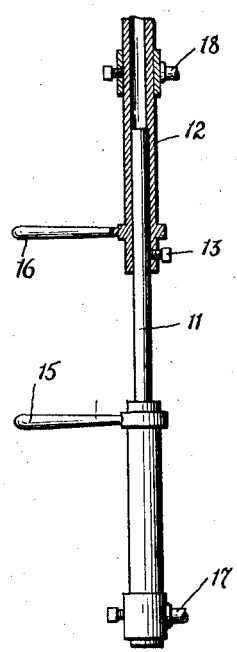
Fig. 3 is a detail view partly in vertical section of the shafts and handles for controlling the outlet of the powder.

The bottom of the receptacle 1 and the top of the platform 5 have each two tubular bearings 9—9 and 10—10 through which is slidably arranged a shaft 11 carrying a tubular shaft 12 as clearly illustrated in the drawings, Fig. 3, a small set screw 13 being provided to lock or unlock the shaft 12 into or from engagement with the shaft 11, the purpose of which operation will be explained later. The lower end of shaft 11 is of the same size as the tubular shaft 12 and is provided with a handle 15, shaft 12 also having a handle 16.

Figure 4:
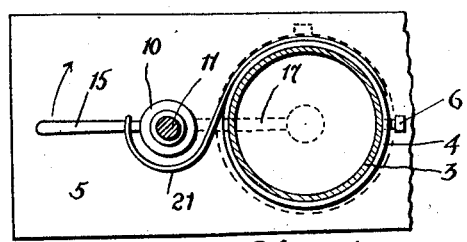
Fig. 4 is an enlarged cross-sectional view taken on line 4—4, Fig. 1, showing in detail one of the measuring cylinders, handle, and spring for retracting the handle.
Figure 5:
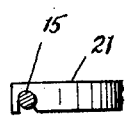
Fig. 5 is a detail view of a portion of the spring illustrating the manner of attaching same to the handle.

Attached to each shaft 11 and 12 are arms 17 and 18 also provided with set screws as shown, the arms carrying closures 19 and 20 for the cylinders 3 and 4 which, as the arms 17 and 18 are turned slide over the openings in the cylinders. A spring (or springs) 21 may be provided if desired to retract the handles 15 and 16 to normal position after each operation. An illustration of the manner of applying this spring is shown in Fig. 4. The upper shaft 12 has blades 22 and 23 which tend to stir the powder and cause it to fall through the openings into the cylinders 3 and 4.

The operation of the device is as follows: Sufficient malted milk or other powdered substance is placed in the receptacle 1 and the cylinders 3 and 4 are set to the desired measurement. The handle 16 is then turned, which by means of the blades 22 and 23 will stir the powder and at the same time open the closure 20. The handle 16 is then returned to normal position by the spring 21 (or by hand) and the handle 15 is turned which opens the closure 19 and allows the powder to be emptied into a suitable receptacle. By tightening the set screw 13 both shafts 12 and 11 may be connected together and one operation of either of the handles will open and close the cylinders.

Having thus described the nature and objects of my invention, what I claim as new and desire to secure by Letters Patent is—

A measuring and dispensing device for powdered substances comprising in combination a receptacle having telescopically arranged cylinders, an adjustable shaft adjacent each cylinder, handles for the shafts, an arm on the upper and lower end of each shaft and carrying closures for the top and bottom of the cylinders, whereby turning the handle or handles will operate to open or close the closures over and under the cylinders, and means carried on the upper part of the shafts for agitating the powder to cause it to fall into the measuring cylinders.

In testimony whereof I have signed my name to this specification.

WILBER S. SHAW.